(12) United States Patent
Pang et al.

(10) Patent No.: US 8,421,898 B2
(45) Date of Patent: Apr. 16, 2013

(54) METHOD FOR DETECTING AND SHOWING QUALITY OF A PREVIEW OR STORED PICTURE IN AN ELECTRONIC IMAGING DEVICE

(75) Inventors: Jian-Xin Pang, Hangzhou (CN); Hua-Qi Zhang, Hangzhou (CN); Li Mei, Hangzhou (CN); Jin Wang, Hangzhou (CN)

(73) Assignee: ArcSoft (Hangzhou) Multimedia Technology Co., Ltd. (CN)

( * ) Notice: Subject to any disclaimer, the term of this patent is extended or adjusted under 35 U.S.C. 154(b) by 336 days.

(21) Appl. No.: 12/805,359

(22) Filed: Jul. 27, 2010

(65) Prior Publication Data

US 2012/0026378 A1 Feb. 2, 2012

(51) Int. Cl.
*H04N 5/222* (2006.01)
(52) U.S. Cl.
USPC ............ 348/333.02; 348/333.01; 348/333.04; 348/333.11; 348/333.12
(58) Field of Classification Search ............ 348/333.01, 348/333.02, 333.04, 333.11, 333.12
See application file for complete search history.

(56) References Cited

U.S. PATENT DOCUMENTS

| 6,539,177 | B2 * | 3/2003 | Parulski ................. 396/287 |
| 7,286,177 | B2 * | 10/2007 | Cooper ................. 348/333.02 |
| 2006/0082661 | A1 * | 4/2006 | Lee et al. ............... 348/231.2 |

* cited by examiner

*Primary Examiner* — Anthony J Daniels
(74) *Attorney, Agent, or Firm* — Bacon & Thomas, PLLC

(57) ABSTRACT

The present invention relates to a method for detecting and showing quality of a preview or stored picture in an electronic imaging device, which comprises the steps of determining whether the electronic imaging device is operated in a preview mode or a file mode; detecting at least four features of the preview or stored picture; determining whether each of the features of the preview or stored picture is normal or not; and displaying the preview or stored picture and at least one of four graphical indicators on a LCD screen of the electronic imaging device when it is determined that the feature corresponding to the graphical indicator is not in a normal status. Thus, a user is able to easily identify the features of the preview or stored picture in a graphical way on the LCD screen in a real time while reviewing the preview or stored picture.

11 Claims, 6 Drawing Sheets

METHOD FOR DETECTING AND SHOWING QUALITY OF A PREVIEW OR STORED PICTURE IN AN ELECTRONIC IMAGING DEVICE

FIELD OF THE INVENTION

The present invention relates to a method for showing a preview or stored picture in an electronic imaging device, and more particularly to a method for detecting and showing quality of the preview or stored picture in the electronic imaging device, so as to enable a user easily to identify at least four features including shaking, exposure, backlight and white balance of the preview picture, or at least four features including blur, exposure, backlight and color of the stored picture from a display of the electronic imaging device, and then adjust quality thereof accordingly.

BACKGROUND OF THE INVENTION

As digital imaging technology advances rapidly in recent years, various personal hand-held digital terminals (such as digital cameras, camcorders, notebook computer, personal digital assistant and mobile phone, etc) equipped with digital imaging components (such as CCD and CMOS, etc) are introduced to the market constantly. Not only quality of the personal hand-held digital terminals becomes higher, but also their sizes or volumes become less, and their prices become lower gradually. These personal hand-held digital terminals available in the market are getting increasingly popular, and many personal hand-held digital terminals equipped with digital imaging devices also have advanced functions such as auto focus and auto exposure. With the increasing of explosive popularity of the personal hand-held digital terminals equipped with the digital imaging devices in recent years, many designers or manufacturers of the digital imaging devices have dedicated their efforts to provide digital imaging devices capable of taking pictures with good quality since the quality of pictures is not only one of the most essential and important factors for determining whether the digital imaging devices are of good quality, but also is a requisite requirement requested by most ordinary users while purchasing the digital imaging devices.

In general, when an ordinary user uses a digital imaging device, such as a digital camera, to take a picture, he/she usually determines the quality of picture going to be taken through a small LCD of the digital camera by eyes. However, since preview pictures shown on the small LCD are often too small to let the user clearly identify the actual quality of the preview picture, which in turn causes the user to take more times in zooming the preview picture in or out for reviewing and identifying the actual quality of the preview picture carefully. Though lots of new technologies, such as auto anti-shaking technology, auto exposure technology and auto white balance technology, have now been widely implemented in the digital cameras for helping users to take pictures with good quality, problems of causing pictures to be taken by the digital cameras in shaking, blur, backlight, under-exposure, over-exposure or bad white balance status still happened while most users operated the digital cameras in situations beyond the controls of these new technologies, which also led to the result of taking pictures with poor quality. In addition, the poor quality of the pictures is also caused by the detection mechanism of the digital cameras, which is unable to show the above statuses of the preview pictures in a real time or to show whether the digital cameras are operated in situations beyond the controls of these new technologies, and puzzles the user to identify whether the poor quality of the pictures is caused by personal skills or digital cameras. According to research by the inventor herein, the detection mechanism for showing the above comprehensive statuses of the preview pictures on the digital cameras in a real time before taking the pictures hasn't been seen in imaging and image processing application, or embedded in operating systems of the digital cameras or other personal hand-held digital terminals equipped with digital imaging components yet. Hence, there exists a prompt need for creating a new and useful method applied to the digital cameras for detecting and showing the above comprehensive statuses of the pictures on a display of the digital cameras in a real time, so as to enable the user to easily identify the quality of the picture before or after the picture is taken by the digital cameras and to ensure that every picture taken by the digital cameras is in a desired quality.

SUMMARY OF THE INVENTION

In view of the problems of causing pictures to be taken by the digital cameras in shaking, blur, backlight, under-exposure, over-exposure or bad white balance status while most digital cameras are operated by the users in situations beyond the controls of the new technologies, such as auto anti-shaking technology, auto exposure technology and auto white balance technology, embedded therein. The inventor of the present invention based on years of experience to conduct extensive researches and experiments and finally invented a method of detecting and showing quality of preview or stored picture in an electronic imaging device, in hope of enabling the electronic imaging device to show all the necessary statuses of the preview pictures on a display of the electronic imaging devices in a real time and enabling the users to operate the electronic imaging devices in situations under the controls of these new technologies, so as to ensure that every picture taken and stored by the electronic imaging devices has a desired quality.

Therefore, it is a primary objective of the present invention to overcome the foregoing shortcomings by providing a method of detecting and showing quality of a preview picture in an electronic imaging device, wherein the electronic imaging device is a personal hand-held digital terminal (i.e. digital cameras, camcorders, notebook computer, personal digital assistant or mobile phone, etc) equipped with digital imaging component (i.e. CCD or CMOS, etc), and comprises at least an image capture unit, an operation unit, a control unit, an image detecting and processing unit, a LCD screen and a storage memory, wherein the image capture unit acquires light originating from a subject, transforms the light into digital data of a picture and then outputs the digital data to the image detecting and processing unit, the image detecting and processing unit receives the image data, transforms the image data into a picture for displaying the picture on the LCD screen as a preview picture or storing the picture in the storage memory as a stored picture, and detects at least four features including shaking, exposure, backlight and white balance of the preview picture, which are used by the electronic imaging device for illuminating the subject in the picture and taking the picture, and the control unit is a central processor for performing arithmetic operation and control operation of the electronic imaging device. The operation unit serves as a user interface including at least a shutter button for operating the electronic imaging device and a control button for activating the control unit to display the stored picture received from the storage memory on the LCD screen. The method of the present invention enables the control unit to execute the steps of enabling the image detecting and processing unit to detect at least four features, i.e. shaking, exposure, backlight and white balance, of the preview picture before the shutter button is fully depressed or released when determining that the electronic imaging device is operated in a preview mode; reading the features of the preview picture received from the image detecting and processing unit; determining whether each of the features of the preview picture is normal or not; enabling the image detecting and processing unit to display the preview picture and at least one of four graphical indicators on the LCD screen when it is determined that the feature corresponding to the graphical indicator is not in a normal status.

Another objective of the present invention is to providing a method of detecting and showing qualities of the stored picture in the electronic imaging device, which enables the control unit to execute the steps of enabling the image detecting and processing unit to detect at least four features, i.e. blur, exposure, backlight and color of the stored picture received from the storage memory after the shutter button of the operation unit is fully depressed and released when determining that the electronic imaging device is operated in a file mode; receiving the features of the stored picture from the image detecting and processing unit; determining whether each of the features of the stored picture is normal or not; enabling the image detecting and processing unit to display the stored picture and at least one of four graphical indicators on the LCD screen when it is determined that the feature corresponding to the graphical indicator is not in a normal status.

Still Another objective of the present invention is to provide the graphical indicators including a color indicator and three indicating meters or bars for indicating color trend of the feature of white balance and intensities of the features of shaking, exposure and backlight of the preview picture or the stored picture detected by the image detecting and processing unit, so as to let the user easily identify the quality of the preview picture or stored picture through the graphical indicators shown on the LCD screen before or after the shutter button of the operation unit is fully depressed and released and ensure that every picture taken and stored by the electronic imaging device has a desired quality.

The above and other objects, features and advantages of the present invention will become apparent from the following detailed description taken with the accompanying drawings.

DETAILED DESCRIPTION OF THE PREFERRED EMBODIMENTS

In general, when a user uses an electronic imaging device (such as a digital camera) to take a picture, the user usually depresses a shutter button of the digital camera all the way down upon recognition of the moment in which the user desires to take the picture. A time lag arises from when the user has visually perceived a target until the user actually depresses the shutter button all the way down, and an additional time lag also arises equal to a period of processing time during which the digital camera takes the picture. Therefore, due to the above mentioned time lags, the ordinary user always fails to take a picture of the moment at which the user has desired to take. Even though the digital camera has already been embedded with new technologies, such as auto anti-shaking technology, auto exposure technology and auto white balance technology, the time lags and the movement of hand holding the digital camera or abruptly depressing the shutter button will cause the picture to be taken in shaking, blur, abnormal backlight, under-exposure, over-exposure or bad white balance statuses since the target actually being taken by the digital camera has already been shifted from a desired position to an unexpected position and is in a situation beyond the controls determined by these new technologies while the shutter button is being fully depressed, that is the reason why many users are unable to always take pictures having a desired quality by using the digital camera.

Figure 1:
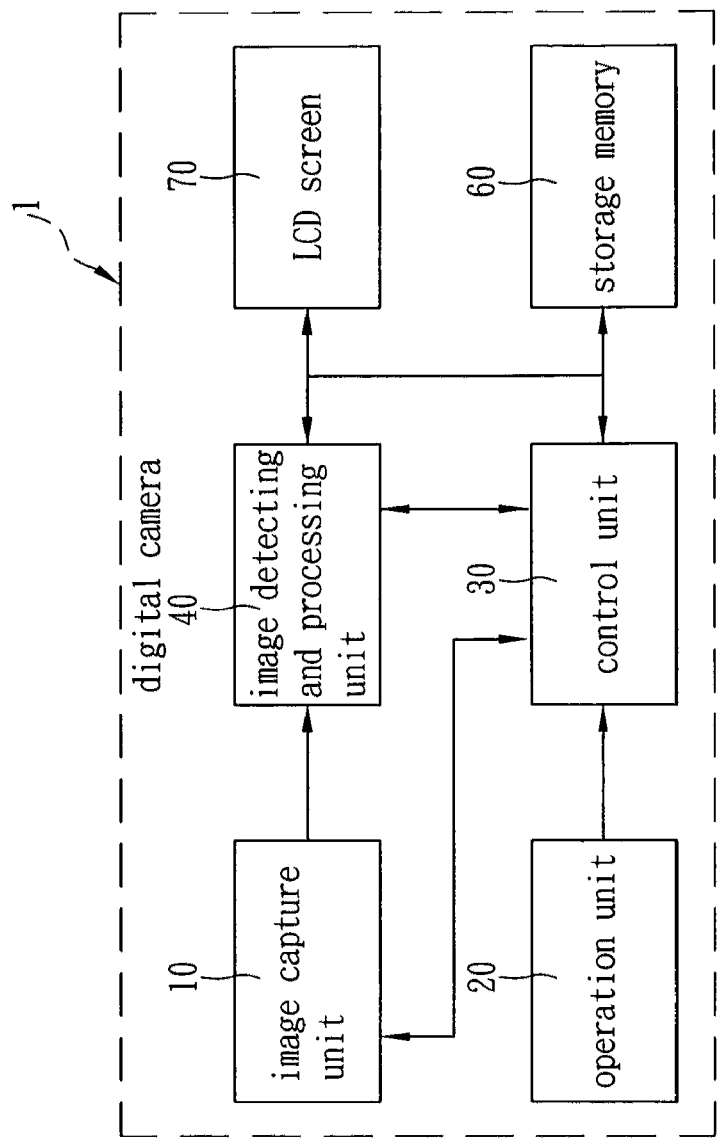
FIG. 1 is a schematic view of block diagram of an electronic imaging device of the present invention.
Figure 2:
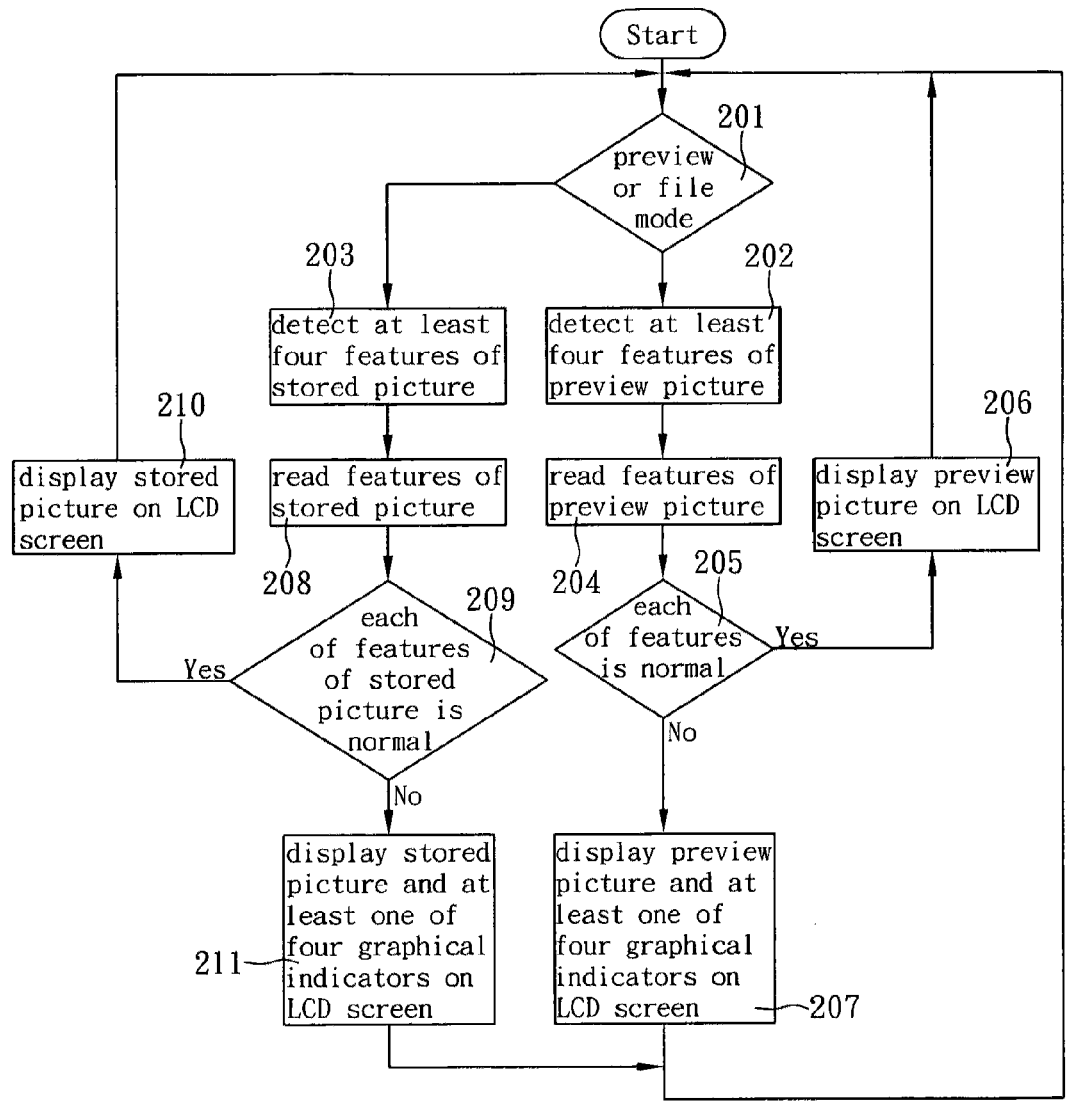
FIG. 2 is a schematic view of flow chart of a method of the present invention.

According to the above, the present invention aims to provide a method of detecting and showing quality of preview or stored picture in an electronic imaging device, which enables the electronic imaging device to show the feature of the pictures going to be taken by the electronic imaging device in a real time, and then enables the user to easily identify the quality of the picture before the user operates the electronic imaging device to take a desired picture. FIG. 1 is a block diagram of an electronic imaging device for implementing the method of the present invention, which is (but not limited to) a digital camera 1 comprises at least an image capture unit 10, an operation unit 20, a control unit 30, an image detecting and processing unit 40, a LCD screen 70 and a storage memory 60, wherein the image capture unit 10 acquires light originating from a subject, transforms the light into digital data of a picture, and then outputs the digital data to the image detecting and processing unit 40. The image detecting and processing unit 40 receives the image data output from the image capture unit 10, transforms the image data according to a predetermined image processing, and thus generates and outputs a picture for displaying the picture on a LCD screen 70 as a preview picture or storing the picture in the storage memory 60 as a stored picture. In addition, the image detecting and processing unit 40 also detects at least four features of the image data, including shaking, exposure, backlight and white balance of the picture, used by the digital camera 1 for illuminating the subject in the picture and taking the picture. The control unit 30 is a central processor for controlling the entirety of the digital camera 1, and performs arithmetic operation and control operation for respective circuits or the like. The LCD screen 70 sequentially displays the picture output by the image detecting and processing unit 40 and thus serves as an electronic viewfinder of the digital camera 1. The operation unit 20 serves as a user interface including at least a shutter button (not shown) for operating the digital camera 1 when the user takes a still picture or a motion picture by use of the digital camera 1 and a control button (not shown) for activating the control unit 30 to display a stored picture received from the storage memory 60 on the LCD screen 70 through the image detecting and processing unit 40. The storage memory 60 is used to store the picture output by the image detecting and processing unit 40 after the shutter button of the operation unit 20 is fully depressed or released. As referring to FIG. 2, the method of the present invention enables the control unit 30 of the digital camera 1 to execute the following steps:

Step (201): determining whether the digital camera 1 is operated in a preview mode or a file mode.

Step (202): when it is determined that the digital camera 1 is operated in the preview mode, enabling the image detecting and processing unit 40 to detect quality of a preview picture before the shutter button of the operation unit 20 is fully depressed or released, wherein the quality of the preview picture includes at least four features of the preview picture, i.e. shaking, exposure, backlight and white balance, and then continuing step (204).

Step (203): when it is determined that the digital camera 1 is operated in the file mode, enabling the image detecting and processing unit 40 to detect quality of the stored picture received from the storage memory 60, wherein the quality of the stored picture includes at least four features of the stored picture, i.e. blur, exposure, backlight and color, and then continuing step (207).

Step (204): reading the features of the preview picture received from the image detecting and processing unit 40.

Step (205): determining whether each of the features of the preview picture is normal or not;

Step (206): enabling the image detecting and processing unit 40 to display the preview picture on the LCD screen 70 when it is determined that all the features of the preview picture are normal and then going back to the step (201); otherwise, continuing step (207).

Step (207): enabling the image detecting and processing unit 40 to display the preview picture and at least one of four graphical indicators on the LCD screen 70 when it is determined that the feature corresponding to the graphical indicator is not in a normal status, and then going back to the step (201). In the present invention, intensity of the feature of shaking or backlight of the preview picture detected by the image detecting and processing unit 40 is defined and configured by the corresponding graphical indicator and ranges from 0 to 100, wherein 100 represents that the preview picture is in a worst status, and 0 represents that the preview picture is in a normal status. Intensity of the feature of exposure of the preview picture detected by the image detecting and processing unit 40 is defined and configured by the corresponding graphical indicator and ranges from −100 to 100, wherein −100 to 0 represents that the preview picture is in an under-exposure status, 0 to 100 represents that the preview picture is in an over-exposure status, and 0 represents that the preview picture is in a normal status. The feature of white balance of the preview picture detected by the image detecting and processing unit 40 is defined and configured by the corresponding graphical indicator with different colors, such as red, green, blue, cyan, yellow and purple, respectively for representing color trend of the preview picture. In view of the above, it will be easy to realize that, when a user uses the digital camera 1 of the present invention to take a picture, the user is able to easily identify the quality of the preview picture through the graphical indicators shown on the LCD screen 70 before the shutter button of the operation unit 20 is fully depressed or released, and is capable of ensuring that every picture taken and stored by the digital camera 1 has a desired quality. In the present invention, the graphical indicators corresponding to the features of exposure, backlight and white balance of the preview picture will be displayed on the LCD screen 70 only when the control unit 30 determines that the feature of shaking of the preview picture is 0, so as to effectively reduce calculation and control burdens of the image detecting and processing unit 40 and the control unit 30 of the digital camera 1. Besides, in order to avoid the unsteadiness of the preview pictures, the feature of shaking detected by the image detecting and processing unit 40 is concluded from the average value of N frames of consecutive preview pictures received from the image capture unit 10, wherein N may be five or other appropriate numbers.

Step (208): reading the features of the stored picture received from the image detecting and processing unit 40.

Step (209): determining whether each of the features of the stored picture is normal or not.

Step (210): enabling the image detecting and processing unit 40 to display the stored picture received from the storage memory 60 on the LCD screen 70 when it is determined that all the features of the stored picture are normal and then going back to the step (201); otherwise, continuing step (211).

Step (211): enabling the image detecting and processing unit 40 to display the stored picture and at least one of four graphical indicators on the LCD screen 70 when it is determined that the feature corresponding to the graphical indicator is not in a normal status, and then going back to the step (201). In the present invention, intensity of the feature of blur or backlight of the stored picture detected by the image detecting and processing unit 40 is defined and configured by the corresponding graphical indicator and ranges from 0 to 100, wherein 100 represents that the stored picture is in a worst status, and 0 represents that the stored picture is in a normal status. Intensity of the feature of exposure of the stored picture detected by the image detecting and processing unit 40 is defined and configured by the corresponding graphical indicator and ranges from −100 to 100, wherein −100 to 0 represents that the stored picture is in an under-exposure status, 0 to 100 represents that the stored picture is in an over-exposure status, and 0 represents that the stored picture is in a normal status. The feature of color of the stored picture detected by the image detecting and processing unit 40 is defined and configured by the corresponding graphical indicator with different colors, such as red, green, blue, cyan, yellow and purple, respectively for representing color trend of the stored picture. In view of the above, it will be obvious that the user is able to easily identify the quality of the stored picture through the graphical indicators shown on the LCD screen 70 after the shutter button of the operation unit 20 is released, and is capable of checking whether every picture taken and stored by the digital camera 1 has a desired quality or not.

Figure 3:
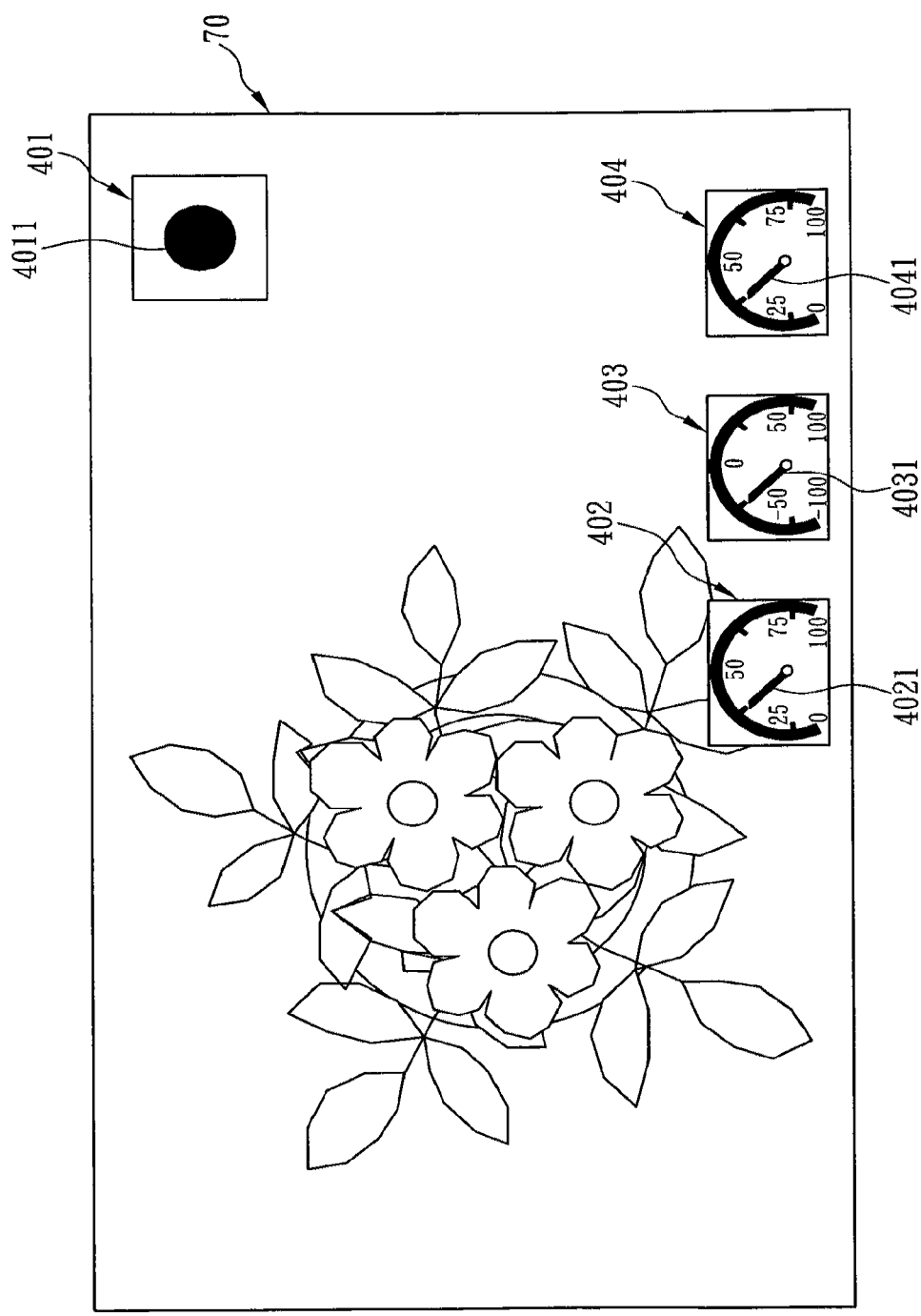
FIG. 3 is a schematic view of a color indicator and three indicating meters shown on a LCD screen of a digital camera as a first preferable embodiment of the present invention for indicating four features (i.e. shaking, exposure, backlight and white balance) of the preview picture.

In a first preferable embodiment of the present invention, as referring to FIG. 3, the graphical indicator shown on the LCD screen 70 and corresponding to the feature of white balance of the preview picture is a color indicator 401 having a circular part 4011 showing color trend, such as red, green, blue, cyan, yellow or purple, of the preview picture according to the feature of white balance of the preview picture detected by the image detecting and processing unit 40. The graphical indicator shown on the LCD screen 70 and corresponding to the feature of backlight of the preview picture is a first indicating meter 402 having a needle 4021 for indicating the intensity of the feature of backlight of the preview picture detected by the image detecting and processing unit 40 and ranging from 0 to 100. The graphical indicator shown on the LCD screen 70 and corresponding to the feature of exposure of the preview picture is a second indicating meter 403 having a needle 4031 for indicating the intensity of the feature of exposure of the preview picture detected by the image detecting and processing unit 40 and ranging from −100 to 100. The graphical indicator shown on the LCD screen 70 and corresponding to the feature of shaking of the preview picture is a third indicating meter 404 having a needle 4041 for indicating the intensity of the feature of shaking of the preview picture detected by the image detecting and processing unit 40 and ranging from 0 to 100.

Figure 4:
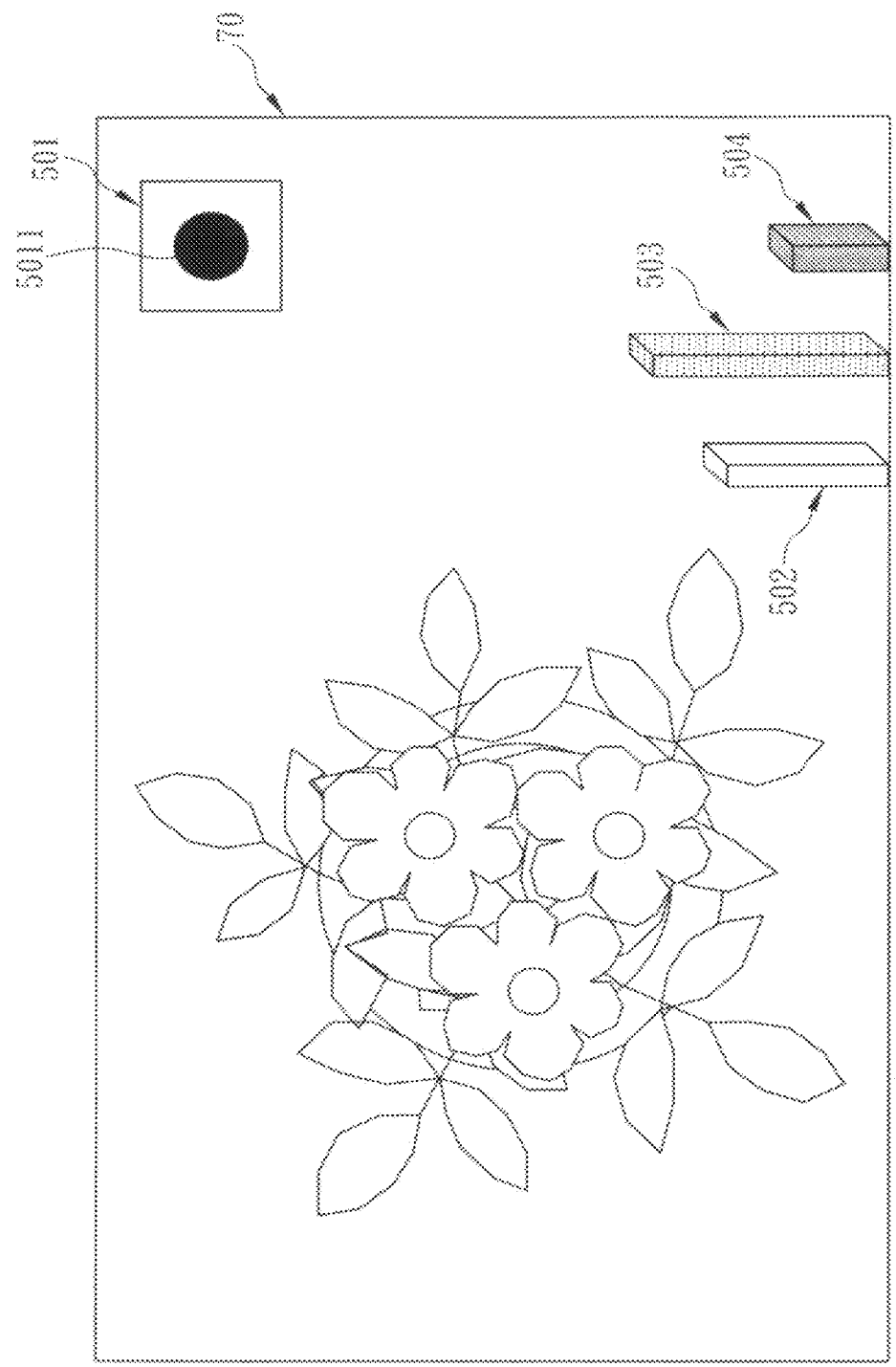
FIG. 4 is a schematic view of a color indicator and three indicating bars shown on a LCD screen of a digital camera as a second preferable embodiment for indicating four features (i.e. shaking, exposure, backlight and white balance) of the preview picture.

In a second preferable embodiment of the present invention, as referring to FIG. 4, the graphical indicator shown on the LCD screen 70 and corresponding to the feature of white balance of the preview picture is a color indicator 501 having a circular part 5011 for showing color trend, such as red, green, blue, cyan, yellow or purple, of the preview picture according to the feature of white balance of the preview picture detected by the image detecting and processing unit 40. The graphical indicator shown on the LCD screen 70 and corresponding to the feature of backlight of the preview picture is a first indicating bar 502 having a height for indicating the intensity of the feature of backlight of the preview picture detected by the image detecting and processing unit 40 and ranging from 0 to 100. The graphical indicator shown on the LCD screen 70 and corresponding to the feature of exposure of the preview picture is a second indicating bar 503 having a height for indicating the intensity of the feature of exposure of the preview picture detected by the image detecting and processing unit 40 and ranging from −100 to 100. The graphical indicator shown on the LCD screen 70 and corresponding to the feature of shaking of the preview picture is a third indicating bar 504 having a height for indicating the intensity of the feature of shaking of the preview picture detected by the image detecting and processing unit 40 and ranging from 0 to 100.

Figure 5:
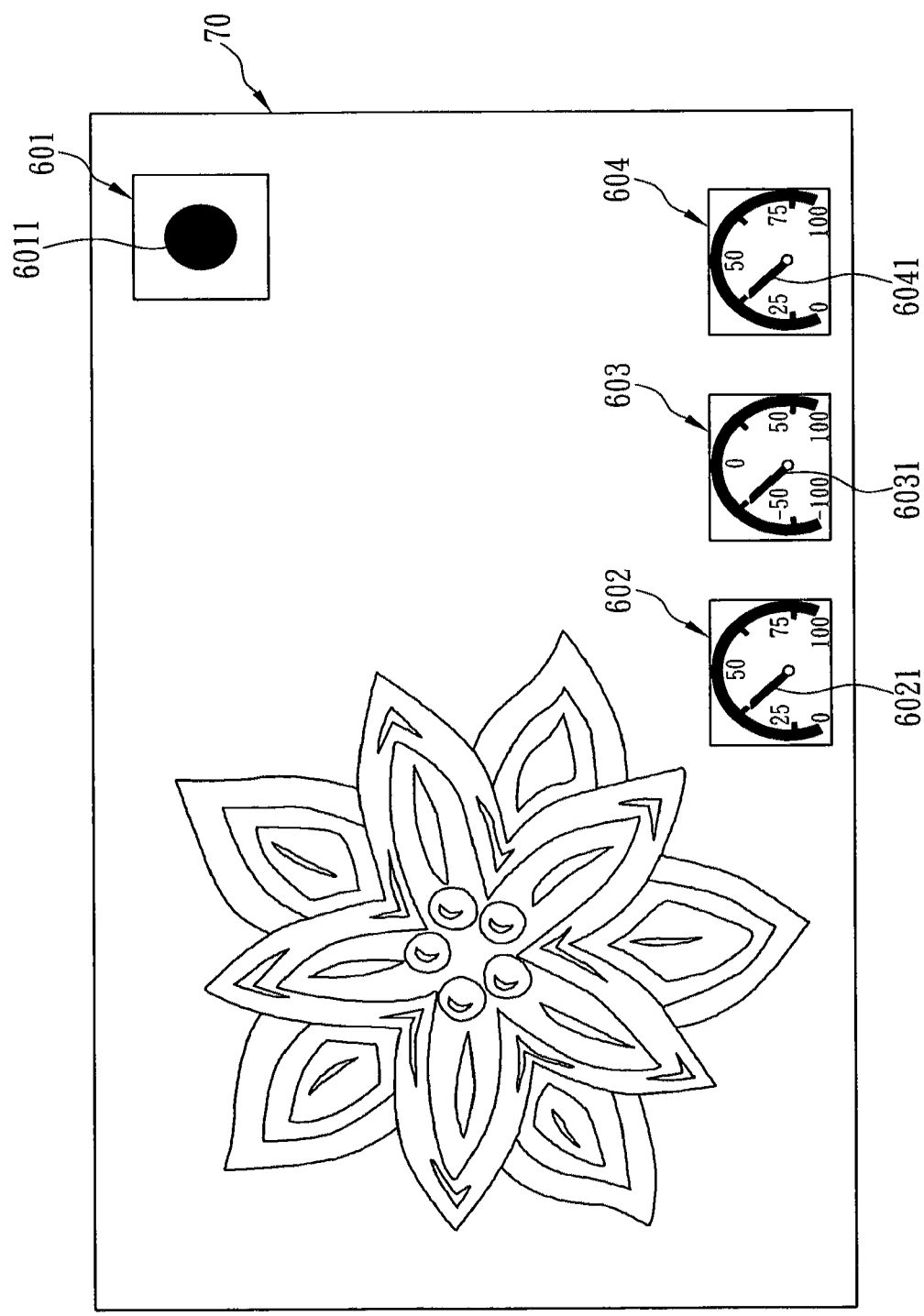
FIG. 5 is a schematic view of a color indicator and three indicating meters shown on a LCD screen of a digital camera as a third preferable embodiment of the present invention for indicating four features (i.e. blur, exposure, backlight and color) of the stored picture.

In a third preferable embodiment of the present invention, as referring to FIG. 5, the graphical indicator shown on the LCD screen 70 and corresponding to the feature of color of the stored picture is a color indicator 601 having a circular part 6011 for showing color trend, such as red, green, blue, cyan, yellow or purple, of the stored picture according to the feature of white balance of the stored picture detected by the image detecting and processing unit 40. The graphical indicator shown on the LCD screen 70 and corresponding to the feature of backlight of the stored picture is a first indicating meter 602 having a needle 6021 for indicating the intensity of the feature of backlight of the stored picture detected by the image detecting and processing unit 40 and ranging from 0 to 100. The graphical indicator shown on the LCD screen 70 and corresponding to the feature of exposure of the stored picture is a second indicating meter 603 having a needle 6031 for indicating the intensity of the feature of exposure of the stored picture detected by the image detecting and processing unit 40 and ranging from −100 to 100. The graphical indicator shown on the LCD screen 70 corresponding to the feature of blur of the stored picture is a third indicating meter 604 having a needle 6041 for indicating the intensity of the feature of blur of the stored picture detected by the image detecting and processing unit 40 and ranging from 0 to 100.

Figure 6:
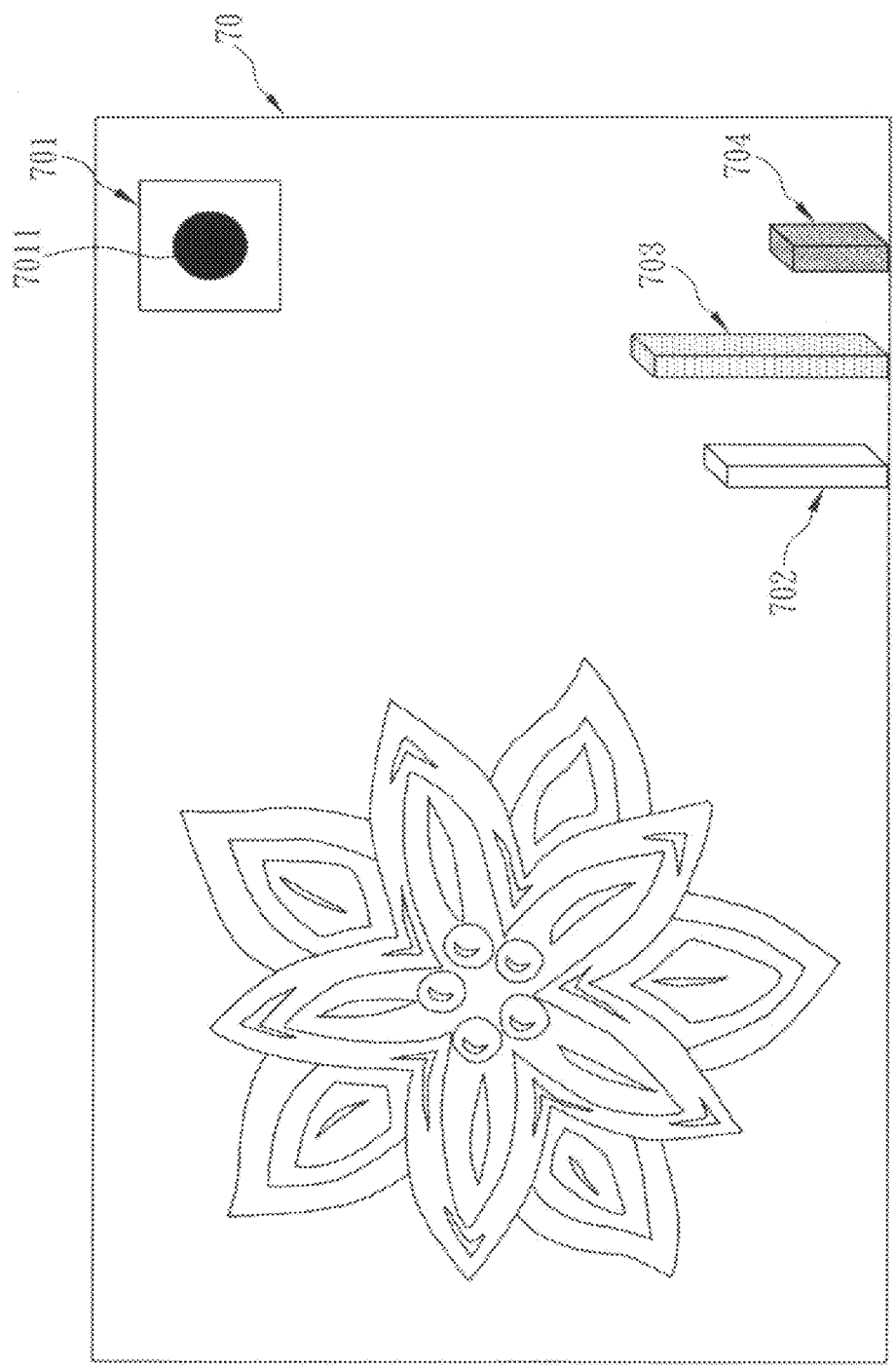
FIG. 6 is a schematic view of a color indicator and three indicating bars shown on a LCD screen of a digital camera as a fourth preferable embodiment for indicating four features (i.e. blur, exposure, backlight and color) of the stored picture.

In a fourth preferable embodiment of the present invention, as referring to FIG. 6, the graphical indicator shown on the LCD screen 70 and corresponding to the feature of color of the stored picture is a color indicator 701 having a circular part 7011 for showing color trend, such as red, green, blue, cyan, yellow or purple, of the stored picture according to the feature of color of the stored picture detected by the image detecting and processing unit 40. The graphical indicator shown on the LCD screen 70 and corresponding to the feature of backlight of the stored picture is a first indicating bar 702 having a height for indicating the intensity of the feature of backlight of the stored picture detected by the image detecting and processing unit 40 and ranging from 0 to 100. The graphical indicator shown on the LCD screen 70 and corresponding to the feature of exposure of the stored picture is a second indicating bar 703 having a height for indicating the intensity of the feature of exposure of the stored picture detected by the image detecting and processing unit 40 and ranging from −100 to 100. The graphical indicator shown on the LCD screen 70 and corresponding to the feature of blur of the stored picture is a third indicating bar 704 having a height for indicating the intensity of the feature of blur of the stored picture detected by the image detecting and processing unit 40 and ranging from 0 to 100.

According to the above, after the method is implemented in the electronic imaging device, the digital cameras 1 is able to clearly show quality of the four features of the preview picture or the stored picture in a graphical way on the LCD screen 70 of the digital cameras 1. Thus, it will be easy for the user to identify all the comprehensive features of the pictures in a real time before or after taking the pictures, and to make sure every picture taken by or stored in the digital camera 1 has a desired quality.

While the invention herein disclosed has been described by means of specific embodiments, numerous modifications and variations could be made thereto by those skilled in the art without departing from the scope and spirit of the invention set forth in the claims.

What is claimed is:

1. A method for detecting and showing quality of a preview picture in an electronic imaging device, which is applied to the electronic imaging device comprising at least an image capture unit, an image detecting and processing unit, a LCD screen, a control unit, an operation unit and a storage memory, wherein the image capture unit acquires light originating from a subject, transforms the light into digital data of a picture and then outputs the digital data to the image detecting and processing unit, the image detecting and processing unit transforms the digital data into a preview picture for displaying the preview picture on the LCD screen, the control unit is a central processor for performing arithmetic operation and control operation of the electronic imaging device, and the operation unit serves as a user interface including at least a shutter button for operating the electronic imaging device to take the preview picture and store the preview picture in the storage memory as a stored picture, the method enabling the control unit to execute the steps of:

determining whether the electronic imaging device is operated in a preview mode or a file mode;

enabling the image detecting and processing unit to detect at least four features of the preview picture before the shutter button is fully depressed or released when it is determined that the electronic imaging device is operated in a preview mode, wherein the features of the preview picture are shaking, exposure, backlight and white balance, and intensity of the feature of shaking or backlight of the preview picture detected by the image detecting and processing unit is defined and configured by the corresponding graphical indicator and ranges from 0 to 100, and wherein 100 represents that the preview picture is in a worst status, and 0 represents that the preview picture is in a normal status;

reading the features of the preview picture received from the image detecting and processing unit;

determining whether each of the features of the preview picture is normal or not; and enabling the image detecting and processing unit to display the preview picture and at least one of four graphical indicators on the LCD screen when it is determined that the feature corresponding to the graphical indicator is not in a normal status, wherein the graphical indicator corresponding to the feature of exposure, backlight or white balance of the preview picture is displayed on the LCD screen when the control unit determines that the feature of shaking of the preview picture is in a normal status.

2. The method of claim 1, wherein intensity of the feature of exposure of the preview picture detected by the image detecting and processing unit is defined and configured by the corresponding graphical indicator and ranges from −100 to 100, −100 to 0 represents that the preview picture is in an under-exposure status, 0 to 100 represents that the preview picture is in an over-exposure status, and 0 represents that the preview picture is in a normal status.

3. The method of claim 2, wherein the feature of white balance of the preview picture detected by the image detecting and processing unit is defined and configured by the corresponding graphical indicator having a circular part for showing color of red, green, blue, cyan, yellow or purple for representing color trend of the preview picture.

4. The method of claim 3, wherein the graphical indicator corresponding to the feature of shaking, backlight or exposure of the preview picture is an indicating meter having a needle for indicating the intensity of the feature of shaking, backlight or exposure of the preview picture.

5. The method of claim 4, wherein the feature of shaking detected by the image detecting and processing unit is concluded from the average value of N frames of the preview pictures consecutively received from the image capture unit, wherein N equals to or is larger than five.

6. The method of claim 3, wherein the graphical indicator corresponding to the feature of shaking, backlight or exposure of the preview picture is an indicating bar having a height for indicating the intensity of the feature of shaking, backlight or exposure of the preview picture.

7. A method for detecting and showing quality of a stored picture in an electronic imaging device, which is applied to the electronic imaging device comprising at least an image capture unit, an image detecting and processing unit, a LCD screen, a control unit, an operation unit and a storage memory, wherein the image capture unit acquires light originating from a subject, transforms the light into digital data of a picture and then outputs the digital data to the image detecting and processing unit, the image detecting and processing unit transforms the digital data into a preview picture for displaying the preview picture on the LCD screen, the control unit is a central processor for performing arithmetic operation and control operation of the electronic imaging device, and the operation unit serves as a user interface including at least a shutter button for operating the electronic imaging device to take the preview picture and store the preview picture in the storage memory as a stored picture, the method enabling the control unit to execute the steps of:

determining whether the electronic imaging device is operated in a preview mode or a file mode;

enabling the image detecting and processing unit to detect at least four features of the stored picture received from the storage memory, when it is determined that the electronic imaging device is operated in the file mode, wherein the features of the stored picture are blur, exposure, backlight and color;

reading the features of the stored picture received from the image detecting and processing unit;

determining whether each of the features of the stored picture is normal or not; and enabling the image detecting and processing unit to display the stored picture and at least one of four graphical indicators on the LCD screen when it is determined that the feature corresponding to the graphical indicator is not in a normal status, wherein intensity of the feature of blur or backlight of the stored picture detected by the image detecting and processing unit is defined and configured by the corresponding graphical indicator and ranges from 0 to 100, 100 represents that the stored picture is in a worst status, and 0 represents that the stored picture is in a normal status.

8. The method of claim 7, wherein intensity of the feature of exposure of the stored picture detected by the image detecting and processing unit is defined and configured by the corresponding graphical indicator and ranges from −100 to 100, −100 to 0 represents that the stored picture is in an under-exposure status, 0 to 100 represents that the stored picture is in an over-exposure status, and 0 represents that the stored picture is in a normal status.

9. The method of claim 8, wherein the feature of color of the stored picture detected by the image detecting and processing unit is defined and configured by the corresponding graphical indicator having a circular part for showing color of red, green, blue, cyan, yellow or purple for representing color trend of the stored picture.

10. The method of claim 9, wherein the graphical indicator corresponding to the feature of blur, backlight or exposure of the stored picture is an indicating meter having a needle for indicating the intensity of the feature of blur, backlight or exposure of the stored picture.

11. The method of claim 9, wherein the graphical indicator corresponding to the feature of blur, backlight or exposure of the stored picture is an indicating bar having a height for indicating the intensity of the feature of blur, backlight or exposure of the stored picture.

* * * * *